UNITED STATES PATENT OFFICE 2,581,385

QUATERNARY AMMONIUM GLYOXALIDINE DERIVATIVES OF ALPHA-HALOGEN CARBOXY ACID ESTERS OF OXYALKYLATED PHENOL-ALDEHYDE RESINS

Melvin De Groote, University City, and Bernhard Keiser, Webster Groves, Mo., assignors to Petrolite Corporation, Ltd., Wilmington, Del., a corporation of Delaware No Drawing. Application December 13, 1948, Serial No. 65,087

8 Claims. (Cl. 260—53)

The present invention is concerned with certain new chemical products, compounds, or compositions which have useful application in various arts. This invention is a continuation-in-part of our co-pending application Serial No. 726,208, filed February 3, 1947, and now abandoned. It includes methods or procedures for manufacturing said new chemical products, compounds, or compositions, as well as the products, compounds, or compositions themselves. Said new compounds or compositions are quaternary ammonium compounds obtained by reaction between a hydroxylated glyoxalidine of the formula:

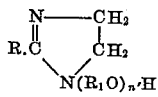

in which RC is the residue of the radical RCO, which, in turn, is the acyl radical of a detergent-forming monocarboxy acid having at least 8 and not more than 22 carbon atoms, and $R_1O$ is an alkylene oxide radical having not over 4 carbon atoms and selected from the class consisting of ethylene oxide radicals, propylene oxide radicals, butylene oxide radicals, glycide radicals, and methylglycide radicals; and $n'$ is a numeral varying from 1 to 3; and the ester of an alpha-halogen monocarboxylic acid having not over 6 carbon atoms and hydrophile hydroxylated synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide; and (B) an oxyalkylation-susceptible, fusible, organic solvent-soluble, water-insoluble, phenol-aldehyde resin; said resin being derived by reaction between a difunctional monohydric phenol and an aldehyde having not over 8 carbon atoms and reactive towards said phenol; said resin being formed in the substantial absence of trifunctional phenols; said phenol being of the formula:

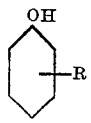

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

Although the herein described products have a number of industrial applications, they are of particular value for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitute the continuous phase of the emulsion. This specific application is described and claimed in our co-pending application Serial No. 65,086, filed December 13, 1948, and now Patent 2,542,003, granted February 20, 1951. The new products are useful as wetting, detergent and leveling agents in the laundry, textile and dyeing industries; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides; emulsifying agents, as, for example, for cosmetics, spray oils, water-repellent textile finishes; as lubricants, etc.

The esters of alpha-halogen monocarboxy acids with oxyalkylated phenol-aldehyde resins which are converted to the quaternary ammonium compounds of the invention are described in our Patent 2,542,003, granted February 20, 1951. The phenol-aldehyde resins and their oxyalkylation are described in our Patent 2,499,370, granted March 7, 1950. Reference is made to these patents for a description of the phenol-aldehyde resins used, their oxyalkylation and their conversion to alpha-halogen monocarboxy acid esters. For examples of phenol-aldehyde resins, reference is made to Examples 1a through 103a of Patent 2,499,370. For examples of the oxyalkylated resins, reference is made to tables at columns 31 through 46 of Patent 2,542,003. For examples of the alpha-halogen monocarboxy acid esters of these oxyalkylated resins, reference is made to Examples 1c through 39c of Patent 2,542,003.

We have found that compounds which are particularly effective as demulsifying agents and also advantageous for other uses, such as those previously enumerated, invariably are apt to be those in which there are more than three ether linkages per phenol radical, and particularly those which have been oxyalkylated sufficiently to give a product which is water-miscible or water-soluble prior to any subsequent reaction. In the hereto appended claims it will be noted that certain of the sub-generic claims are limited to the use of an initial reagent, to wit, an oxyalkylated thermoplastic resin of the kind described, which is distinctly hydrophile in character, at least to the extent that it is water-miscible. One advantage of such reactant is that it can be combined with compounds such as bromostearic acid, followed by reaction with dimethyl octadecenylamine, or dimethyl octadecylamine and still yield a final product having very definite hydrophile properties, notwithstanding the fact that the two subsequent reactants each have at least 18 carbon atoms. In any event, having obtained an oxyalkylated thermoplastic phenol-aldehyde resin of the kind described in either the non-hydrophile type or the hydrophile type, preferably the latter, one reacts such product with a suitable alpha-chloro fatty acid having not over 6 carbon atoms, or its equivalent, such as alpha-chloro acyl chloride, or an ester, with the same limitation in regard to the carbon atom. If a low molal alpha-chloro fatty acid is employed, then water is eliminated as a resultant of the reaction; whereas, if an alpha-chloro acyl chloride is employed, or a bromide is employed, then a halogen acid such as hydrochloric is eliminated. The amount of alpha-chloro fatty acid reactant may be sufficient to combine with all the stable reactive hydroxyl radicals present, based on the hydroxyl value, or with only a fraction thereof, such as 25%, 35%, 50%, or 75%. One advantage in using hydrophile oxyalkylated thermoplastic phenol-aldehyde resins as reactants, is that one need not introduce as many quaternary ammonium radicals as might otherwise be required to give distinct hydrophile character, i. e., the ability to form at least a permanent sol in water.

Having employed an alpha-chloro low molal fatty acid or its equivalent, the resultant product is a complete or fractional ester of such alpha-chloro low molal acid, and the alpha-chloro atom is, of course, markedly reactive. The next step is to react such complete or fractional ester with an amino type compound of the kind exemplified by the prior formula:

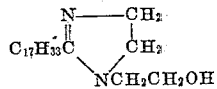

A variety of such amines suitable for reaction will be described in the subject-matter immediately following.

The particular intermediate products supplying the amine reactant herein contemplated are limited to types in which all amino nitrogen atoms are tertiary. As a matter of convenience in the manufacture, we prefer to use derivatives of ethylene diamine. Since ethylene diamine ordinarily comes on the market in the form of a 70% solution in water, and since aminoethyl ethanolamine (hydroxyethyl ethanoldiamine) is available in substantially 100% concentration, we prefer to use this particular product as a raw material, insofar that it can be converted into the glyoxalidine without destruction of the hydroxyl group. This also applies to the derivatives of ethylenediamine and propylene oxide, butylene oxide, glycide, and methylglycide, for example, hydroxypropylene ethylenediamine, hydroxybutyl ethylenediamine, and dihydroxypropyl ethylenediamine. Thus, one may obtain a homogeneous compound, such as 1-hydroxypropyl-2-heptadecenyl glyoxalidine, 1-hydroxybutyl-2-heptadecenyl glyoxalidine, 1-dihydroxybutyl-2-heptadecenyl glyoxalidine, etc.

Similarly, where the heptadecenyl radical appears resulting from the use of oleic acid as a raw material, one can use stearic acid, naphthenic acid, or anyone of a number of detergent-forming monocarboxy acids having at least 8 and not more than 22 carbon atoms. Thus, other examples include 1-hydroxyethyl-2-heptadecyl glyoxalidine, 1-hydroxybutyl-2-heptadecyl glyoxalidine, 1-dihydroxybutyl-2-heptadecyl glyoxalidine, etc.

An alternate procedure is to produce the imidazoline and react the imidazoline with one to six moles of a suitable oxyalkylating agent, as previously described. Our preference is to react the imidazoline with a single mole of the oxyalkylating agent. In this connection, as to the manufacture of undecylimidazoline, heptadecylimidazoline, heptadecenylimidazoline, and other suitable imidazolines, see U. S. Patent No. 2,215,862, dated September 24, 1940, to Waldmann. Having obtained such imidazoline, it need only be subjected to treatment with ethylene oxide, etc., in the customary manner. This particular procedure, oxyalkylation, is described in detail in the patent literature, including U. S. Patent No. 2,353,708, dated July 18, 1944, to De Groote and Keiser. Attention is directed to the fact that this patent also describes the manufacture of imidazolines by reference to various patents which include ethylenediamine as a reactant. In essence, then, the amine reactants are best described in the following formula:

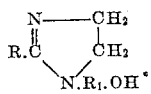

in which RC is the residue of the acyl radical RCO, which, in turn, is the acyl radical of a detergent-forming monocarboxy acid having at least 8 and not more than 22 carbon atoms, and $R_1O$ is an alkylene oxide radical having not over 4 carbon atoms, and selected from the class consisting of ethylene oxide radicals, propylene oxide radicals, butylene oxide radicals, glycide radicals, and methylglycide radicals.

Since one to six moles of the oxyalkylating agent can be employed per mole of amine, in a broader aspect, the reagent may be defined as follows:

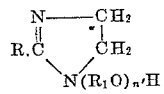

in which the characters have their previous significance and $n'$ represents the numerals 1 to 6.

Referring to a consideration of the alpha-chloro fatty acids or the chlorides, it is our preference to use chloroacetic acid, for the reason that it is cheap and particularly reactive. Chloroacetyl chloride is a preferred reactant, from the standpoint of reactivity, but is objectionable for two reasons—one being that eliminating hydrochloric acid in the reaction, there is a tendency to cause corrosion of the apparatus, unless especially designed, and secondly, this reactant is comparatively expensive. However, except for these two objections, it may be considered as a preferred reactant. Our preference is to use any alpha-halogen carboxylic acid, if not over six carbon atoms. Other suitable acids include alpha-chloropropionic acid, alpha - chlorobutyric acid, alpha - bromoisocaproic acid, bromoacetic acid, iodoacetic acid, etc. The acyl halides or anhydrides of these acids, of course, may be employed. In many instances the alpha-halogenated acyl chloride is as readily available as the alpha-halogen acid. The reason for this is the fact that it is difficult to halogenate an acid so as to introduce the halogen in an alpha position, but an acyl halide reacts more rapidly and the halogen enters the alpha position, due to the negative effect of both the chlorine atom and the carbonyl atom. Under such circumstances, where the alpha-chloroacyl acid is available, there is no reason, of course, to hydrolyze an acyl chloride to the acid in order to use the acid instead.

Specific examples of glyoxalidine or imidazoline which can be reacted with ethylene oxide or propylene oxide for the reason that they have a labile hydrogen (a hydrogen atom directly attached to an oxygen atom or a nitrogen atom, or both) may be illustrated by the following examples:

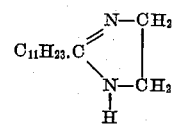

2-undecylimidazoline

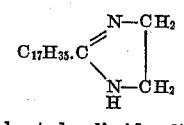

2-heptadecylimidazoline

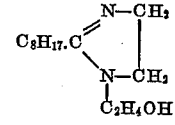

2-octyl,1-hydroxyethylimidazoline

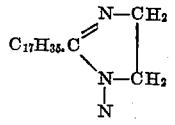

2-oleylimidazoline

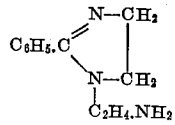

2-phenyl,1-aminoethylimidazoline

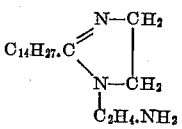

2-substituted imidazoline from naphthenic acid (from kerosene) and triethylenetetramine

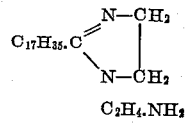

2-heptadecyl, 1-aminoethylimidazoline

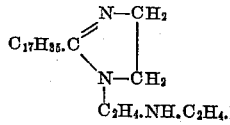

2-heptadecyl, 1-diethylenediaminoimidazoline

Referring to the reaction of chloroacetic acid with an oxyalkylated resin, this may be illustrated by considering a structural unit of the resin as a unit. Thus, a structural unit may be depicted in the following manner:

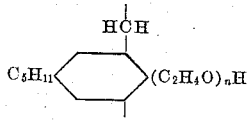

After reaction with chloroacetic acid, the structural unit appears as follows:

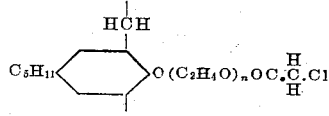

The thermoplastic resins employed as raw materials are hard, brittle resins, varying in color from a pale pink to a dark amber. The oxyalkylated resins derived from the thermoplastic resins vary from resinous to subresinous materials to thick oils or wax-like bodies. The color, as a result of the next reaction, formation of the chloroacetate, is apt to be much darker in appearance, varying from honey color to a deep brown or amber. Such oily or sub-resinous materials are then reacted with amines of the kind described, by simply heating to approximately 135° C. to 165° C. for approximately 2 to 8 hours. Often the reaction is complete within as little as a half an hour, and may be complete at an even lower temperature than the one suggested. The reaction involved, ignoring side reaction, may be illustrated as follows:

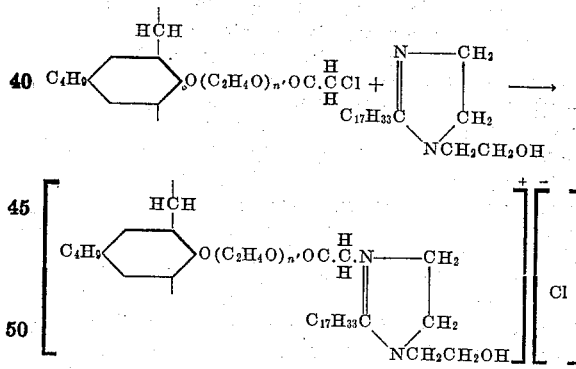

As will be pointed out subsequently, the acylated tertiary amine may have two or more basic amino nitrogen atoms and two or more acyl radicals. In other words, such polyamine would be polyfunctional towards the halogenated acid ester, and thus, could combine with more than one mole of halogenated acid ester.

It will be noted that the hydroxylated glyoxalidine has two basic tertiary nitrogen atom. For this reason no effort is made to indicate with which particular nitrogen atom combination takes place. Likewise, it is obvious that 2 moles of the halogenated acid ester could combine with 1 mole of the glyoxalidine. Previous reference has been made to the glyoxalidines employed as reactants. Such reactants are obtained, as previously indicated, by combining ethylene diamine with a mole of an alkylene oxide, such as ethylene oxide, propylene oxide, butylene oxide, glycide, or methyl glycide and then converting into the amide with a mole of a detergent-forming monocarboxy acid or its equivalent.

It is well known that certain monocarboxy organic acids containing 8 carbon atoms or more, and not more than 32 carbon atoms, are characterized by the fact that they combine with alkalis to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids. For instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

The hydroxylated glyoxalidine used as a reactant is preferably derived from unsaturated fatty acids having 18 carbon atoms. Such unsaturated fatty acids include oleic acid, ricinoleic acid, linoleic acid, linolenic acid, etc. One may employ mixed fatty acids, as, for example, the fatty acids obtained from hydrolysis of cottonseed oil, soyabean oil, etc. More specifically, our ultimate preference is to use a glyoxalidine obtained from unsaturated fatty acids, and more especially, unsaturated fatty acids containing a hydroxyl radical, or unsaturated fatty acids which have been subjected to oxidation. In addition to synthetic carboxy acids obtained by the oxidation of paraffins or the like, there is the somewhat analogous class obtained by treating carbon dioxide or carbon monoxide, in the presence of hydrogen or an olefine, with steam, or by causing a halogenated hydrocarbon to react with potassium cyanide and saponifying the product obtained. Such products or mixtures thereof, having at least 8 and not more than 32 carbon atoms and having at least one carboxyl group or the equivalent thereof, are suitable as detergent-forming monocarboxy acids; and another analogous class equally suitable, is the mixture of carboxylic acids obtained by the alkali treatment of alcohols of high molecular weight formed in the catalytic hydrogenation of carbon monoxide.

As is well known, one need not use a high molal carboxy acid, such as a fatty acid, for introduction of the acyl group or acyloxy group. Any suitable functional equivalent such as the acyl halide, the anhydride, ester, amide, etc., may be employed.

Thus, after a detergent-forming monocarboxy acid and preferably one having 8 to 18 carbon atoms, is reacted with the hydroxylated ethylene diamine to form the amide, a subsequent reaction is employed, to wit, conversion of the amide into the glyoxalidine.

The manufacturing procedure can also be reversed by forming the amide of the ethylene diamine, converting into a glyoxalidine having a secondary nitrogen atom, thus:

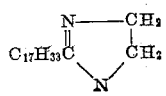

Such glyoxalidine can then be oxyalkylated in a conventional manner to yield the hydroxylated derivative. One need not employ a single mole of the ethylene oxide, but may employ 1, 2 or 3 moles, although generally speaking, there is no advantage in using such additional amounts of reactants. Such oxyalkylation procedure is conventional.

Briefly, then, the amine reactant here employed is a glyoxalidine of the following structure:

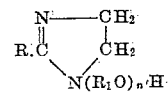

R.C is the radical obtained by deoxygenation of the acyl radical RCO of a detergent-forming monocarboxy acid having at least 8 and not more than 32 carbon atoms, and preferably, not over 22 carbon atoms; R₁O is an alkylene oxide radical having not over 4 carbon atoms and selected from the class consisting of ethylene oxide, propylene oxide, butylene oxide, glycide and methyl glycide, and $n'$ is a numeral varying from 1 to 3. Having obtained both the halogenated acid ester, such as a chloroacetic acid ester of the kind previously described and the hydroxylated glyoxalidine, all that is required is to react the products so as to form a quaternary ammonium compound, all of which may be illustrated by the following examples:

In the following examples the particular imidazoline employed was obtained by treating stearic acid with tetraethylenepentamine, mole for mole, in the manner previously described. The formula for the imidazoline was as follows:

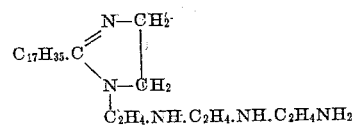

Such imidazoline was then treated with ethylene oxide in the molar ratios of 1 to 1, 3 to 1 and 5 to 1, being on the basis of oxide to imidazoline. Such derivatives were then employed in preparation of the following examples of quaternary ammonium derivatives:

*Example 1ᵈ*

400 grams of the xylene-containing ester reactant identified as 8c of Patent 2,542,003, were mixed with an equimolar amount, or 144 grams of oxyethylated imidazoline (3 moles of ethylene oxide to one mole of the imidazoline) described in the text immediately preceding. This imidazoline was obtained from tetraethylenepentamine and stearic acid. To the mixture there was added an amount of xylene equivalent to about one-fourth the weight of tertiary amine. In the instant case the amount added was 35 grams.

Although in the instant experiment, and those subsequently noted, the solvent employed was xylene, one may employ cymene or decalin. The reaction takes place at comparatively low temperature, as previously suggested, and, in any event, under 215° C., and frequently as low as 120° C. A convenient temperature of reaction is 140° to 160° C. Thus, if xylene is employed, as is our preference, and if there is present at least 25% by weight of the combined reactants in the form of xylene, there is the automatic effect in regard to the temperature, and the xylene may be permitted to remain after the reaction is complete. If desired, it may be eliminated in any convenient manner, such as distillation or vacuum distillation. In all cases we have used a time period of 2 to 4 hours and found the reaction was complete at the end of the 4 hour period. In some cases we believe the reaction was complete in 30 to 45 minutes. In this particular reaction, and in most of the subsequent reactions, we have attempted to have sufficient xylene present, adding more if need be, so the final reaction product contains approximately 40% xylene and 60% quaternary compound. A solution of this concentration is usually free from any highly viscous or tacky properties, and is convenient for use in a pump, which is particularly desirable when used as a demulsifier.

The final product obtained was a viscous, deep amber colored fluid, completely water-soluble, and containing 38.2% xylene.

Example 2d

The same procedure was followed as in Example 1d, except that 400 grams of ester identified as 2c of Patent 2,542,003 were reacted with 175 grams of the oxyethylated imidazoline described in Example 1d, preceding. The final product was a viscous, deep amber-colored liquid, completely water-soluble and containing 41% xylene.

Example 3d

The same procedure was followed as in Example 1d, except that 400 grams of ester identified as 12c of Patent 2,542,003 were reacted with 163 grams of the oxyethylated imidazoline described in Example 1d, preceding. The final product was a viscous, deep amber-colored, water-soluble, somewhat cloudy liquid, containing 44.2% xylene.

Example 4d

The same procedure was followed as in Example 1d, except that 400 grams of ester identified as 18c of Patent 2,542,003 were reacted with 145 grams of the oxyethylated imidazoline described in Example 16, preceding. The final product was a non-viscous, deep amber-colored, water-soluble liquid, containing 37.4% xylene.

Example 5d

The same procedure was followed as in Example 1d, except that 400 grams of ester identified as 3c of Patent 2,542,003 were reacted with 123 grams of the oxyethylated imidazoline described in Example 1d, preceding. The final product was a viscous, deep amber-colored, water-soluble liquid, containing 37.6% xylene.

Example 6d

The same procedure was followed as in Example 1d, except that 400 grams of ester identified as 23c of Patent 2,542,003 were reacted with 168 grams of the oxyethylated imidazoline described in Example 1d, preceding. The final product was a viscous, deep amber-colored, water-soluble liquid, containing 33.6% xylene.

Example 7d

The same procedure was followed as in Example 1d, except that 400 grams of the ester reactant identified as 24c of Patent 2,542,003 were reacted with 118 grams of the oxyethylated imidazoline previously described as being obtained by use of one mole of ethylene oxide per mole of imidazoline instead of the 3 to 1 ratio reactant employed in the previous six examples. The imidazoline itself, was, as previously stated, obtained from stearic acid and tetraethylenepentamine. The product obtained was a viscous, deep amber-colored liquid which gave a cloudy solution in water and contained 35% xylene.

Example 8d

The same procedure was followed as in Example 1d, preceding, except that 400 grams of the ester reactant identified as 8c of Patent 2,542,003 were reacted with 163 grams of the oxyethylated imidazoline obtained by use of 5 moles of ethylene oxide per mole of imidazoline. This derivative has been described previously and was obtained from the imidazoline which was obtained by reaction between stearic acid and tetraethylenepentamine. The product obtained was a viscous, deep amber-colored, water-soluble liquid, containing 37% xylene.

Example 9d

The same procedure was followed as in Example 1d, preceding, except that 400 grams of the ester derivative identified as 2c of Patent 2,542,003 were reacted with 197 grams of the 5 to 1 ratio oxyethylated imidazoline described in Example 8d, preceding. The product obtained was a viscous, deep amber-colored, water-soluble liquid, containing 39.6% xylene.

Example 10d

The same procedure was followed as in Example 1d, preceding, except that 400 grams of the ester derivative identified as 12c of Patent 2,542,003 were reacted with 184 grams of the 5 to 1 ratio oxyethylated imidazoline described in Example 8d, preceding. The product obtained was a viscous, deep amber-colored, water-soluble liquid, containing 43% xylene.

Example 11d

The same procedure was followed as in Example 1d, preceding, except that 400 grams of the ester derivative identified as 18c of Patent 2,542,003 were reacted with 164 grams of the 5 to 1 ratio oxyethylated imidazoline described in Example 8d, preceding. The product obtained was a viscous, deep amber-colored, very water-soluble liquid, containing 36% xylene.

Example 12d

The same procedure was followed as in Example 1d, preceding, except that 400 grams of the ester derivative identified as 3c of Patent 2,542,003 were reacted with 131 grams of the 5-to-1 ratio oxyethylated imidazoline described in Example 8d, preceding. The product obtained was a viscous, deep amber-colored, very water-soluble liquid, containing 35.8% xylene.

Example 13d

The same procedure was followed as in Example 1d, preceding, except that 400 grams of the ester derivative identified as 23c of Patent 2,542,003 were reacted with 189 grams of the 5-to-1 ratio oxyethylated imidazoline described in Example 8d, preceding. The product obtained was a viscous, deep amber-colored, very water-soluble liquid, containing 32.6% xylene.

Example 14d

The same procedure was followed as in Example 1d, preceding, except that 400 grams of the ester derivative identified as 24c of Patent 2,542,003 were reacted with 158 grams of the 5-to-1 ratio oxyethylated imidazoline described in Example 8d, preceding. The product obtained was a viscous, deep amber-colored, very water-soluble liquid, containing 33% xylene.

Having thus described our invention, what we claim as new and desire to secure by Letters Patent is:

1. A quaternary ammonium compound obtained by reaction between a hydroxylated glyoxalidine of the formula:

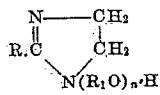

in which RC is the residue of the radical RCO, which, in turn, is the acyl radical of a detergent-forming monocarboxy acid having at least 8 and not more than 22 carbon atoms, and $R_1O$ is an alkylene oxide radical having not over 4 carbon atoms and selected from the class consisting of ethylene oxide radicals, propylene oxide radicals, butylene oxide radicals, glycide radicals, and methylglycide radicals; and $n'$ is a numeral varying from 1 to 3; and an ester in which the acyl radical is that of an alpha-halogen monocarboxylic acid having not over 6 carbon atoms and composed of carbon, hydrogen, oxygen and halogen and the alcoholic radical is that of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide; and (B) an oxyalkylation-susceptible, fusible, organic solvent-soluble, water-insoluble, phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

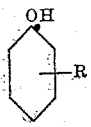

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

2. A quaternary ammonium compound obtained by reaction between a hydroxylated glyoxalidine of the formula:

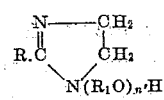

in which RC is the residue of the radical RCO, which, in turn, is the acyl radical of a detergent-forming monocarboxy acid having at least 8 and not more than 22 carbon atoms, and $R_1O$ is an alkylene oxide radical having not over 4 carbon atoms and selected from the class consisting of ethylene oxide radicals, propylene oxide radicals, butylene oxide radicals, glycide radicals, and methylglycide radicals; and $n'$ is a numeral varying from 1 to 3; and a chloroacetate of certain hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide; and (B) an oxyalkylation-susceptible, fusible, organic solvent-soluble, water-insoluble, phenolaldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

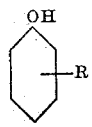

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with proviso that at least 2 moles of alkylene oxide be introduced for each phenolic nucleus; and with the final proviso that the hydrophile properties of the ultimate quaternary ammonium compound as well as the oxyalkylated resin in an equal weight of xylene are sufficient to produce an emulsion when said xylene solution is shaken vigorously with one to three volumes of water.

3. A quaternary ammonium compound obtained by reaction between a hydroxylated glyoxalidine of the formula:

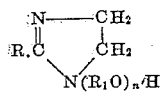

in which RC is the residue of the radical RCO, which, in turn, is the acyl radical of a detergent-forming monocarboxy acid having at least 8 and not more than 22 carbon atoms, and $R_1O$ is an alkylene oxide radical having not over 4 carbon atoms and selected from the class consisting of ethylene oxide radicals, propylene oxide radicals, butylene oxide radicals, glycide radicals, and methylglycide radicals; and $n'$ is a numeral varying from 1 to 3; and a chloroacetate of certain hydrophile polyhydric synthetic products; said hydrophile synthetic products being oxyethylation products of (A) ethylene oxide, and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

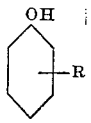

in which R is a hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of the ultimate quaternary ammonium compound as well as the oxyethylated resin in an equal weight of xylene are sufficient to produce an emulsion when said xylene solution is shaken vigorously with one to three volumes of water.

4. A quaternary ammomium compound obtained by reaction between a hydroxylated glyoxalidine of the formula:

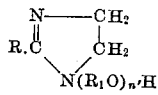

in which RC is the residue of the radical RCO, which, in turn, is the acyl radical of a detergent-forming monocarboxy acid having at least 8 and not more than 22 carbon atoms, and $R_1O$ is an alkylene oxide radical having not over 4 carbon atoms and selected from the class consisting of ethylene oxide radicals, propylene oxide radicals, butylene oxide radicals, glycide radicals, and methylglycide radicals; and $n'$ as a numeral varying from 1 to 3; and a chloroacetate of certain hydrophile synthetic products; said hydrophile synthetic products being oxyethylation products of (A) ethylene oxide, and (B) an oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than two; said phenol being of the formula:

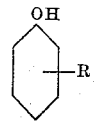

in which R is an aliphatic hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of the ultimate quaternary ammonium compound as well as the oxyethylated resin in an equal weight of xylene are sufficient to produce an emulsion when said xylene solution is shaken vigorously with one to three volumes of water.

5. The product of claim 4, wherein R is substituted in the para position.

6. The product of claim 4, wherein R is a butyl radical substituted in the para position.

7. The product of claim 4, wherein R is an amyl radical substituted in the para position.

8. The product of claim 4, wherein R is a nonyl radical substituted in the para position.

MELVIN DE GROOTE.
BERNHARD KEISER.

REFERENCES CITED

The following references are of record in the file of this patent:

UNITED STATES PATENTS

| Number | Name | Date |
| --- | --- | --- |
| 2,499,365 | De Groote | Mar. 7, 1950 |